US010438118B2

(12) United States Patent
Dwarakanath et al.

(10) Patent No.: US 10,438,118 B2
(45) Date of Patent: Oct. 8, 2019

(54) VERIFICATION BY METAMORPHIC TESTING OF APPLICATIONS THAT UTILIZE ARTIFICIAL INTELLIGENCE

(71) Applicant: Accenture Global Solutions Limited, Dublin (IE)

(72) Inventors: Anurag Dwarakanath, Bangalore (IN); Sanjay Podder, Thane (IN); Neville Dubash, Mumbai (IN); Kishore P Durg, Bangalore (IN); Manish Ahuja, US Nagar (IN); Raghotham M Rao, Bangalore (IN); Samarth Sikand, Rajasthan (IN); Jagadeesh Chandra Bose Rantham Prabhakara, Chittoor (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/146,069

(22) Filed: Sep. 28, 2018

(65) Prior Publication Data

US 2019/0108443 A1 Apr. 11, 2019

(30) Foreign Application Priority Data

Oct. 9, 2017 (IN) .............................. 201741035749

(51) Int. Cl.
*G06N 3/08* (2006.01)
(52) U.S. Cl.
CPC ..................................... *G06N 3/08* (2013.01)

(58) Field of Classification Search
None
See application file for complete search history.

(56) References Cited

U.S. PATENT DOCUMENTS

| 6,810,364 | B2 | 10/2004 | Conan et al. | |
|---|---|---|---|---|
| 2017/0017903 | A1* | 1/2017 | Gray | G06F 3/14 |
| 2017/0124487 | A1* | 5/2017 | Szeto | G06N 7/005 |

OTHER PUBLICATIONS

Murphy et al., Using JML Runtime Assertion Checking to Automate Metamorphic Testing in Applications without Test Oracles, 2009 International Conference on Software Testing Verification and Validation, pp. 436-445 (Year: 2009).*

(Continued)

*Primary Examiner* — Alan Chen
(74) *Attorney, Agent, or Firm* — Harrity & Harrity, LLP

(57) ABSTRACT

A device may receive, from a user device, a request to verify a machine learning (ML) application using a metamorphic testing procedure. The device may determine a type of ML process used by the ML application, and may select one or more metamorphic relations (MRs), to be used for performing the metamorphic testing procedure, based on the type of ML process. The device may receive test data to be used to test the ML application, wherein the test data is based on the one or more MRs, and may perform, by using the one or more MRs and the test data, the metamorphic testing procedure to verify one or more aspects of the ML application. The device may generate a report that indicates whether the one or more aspects of the ML application have been verified and may provide the report for display on an interface of the user device.

20 Claims, 10 Drawing Sheets

(56) References Cited

OTHER PUBLICATIONS

Chalin et al., An Integrated Verification Environment for JML: Architecture and Early Results, Sixth International Workshop on Specification and Verification of Component-Based Systems (SAVCBS 2007), Sep. 2007, pp. 47-53 (Year: 2007).*
Chu et al., Distributed In Vivo Testing of Software Applications, 2008 International Conference on Software Testing, Verification, and Validation, pp. 509-512.*
Christian Murphy et al. "Automatic System Testing of Programs Without Test Oracles", Jul. 19, 2019, pp. 189-200, XP058298092.
Kanewala Upulee et al. "Using Machine Learning Techniques to Detect Metamorphic Relations for Programs Without Test Oracles", Nov. 4, 2013, pp. 1-3, XP032547543.
Sergio Segura et al. "Metamorphic Testing: A Literature Review", May 25, 2015, http://www.isa.us.es/sites/default/files/segura15-tr.pdf, 124 pages, XP055527419.
Extended European Search report corresponding to EP 18199225.6 dated Dec. 7, 2018, 14 pages.
Murphy et al., "Empirical Evaluation of Approaches to Testing Applications without Test Oracles", https://academiccommons.columbia.edu/doi/10.7916/D88G8TMC, 2010, 799 pages.
Murphy et al., "Improving the dependability of machine learning applications", https://academiccommons.columbia.edu/doi/10.7916/D8P2761H, 2008, 21 pages.
Xie et al., "Application of Metamorphic Testing to Supervised Classifiers", https://www.ncbi.nlm.nih.gov/pmc/articles/PMC3019603/, Jan. 15, 2009, 15 pages.
Xie et al., "Testing and Validating Machine Learning Classifiers by Metamorphic Testing", https://www.ncbi.nlm.nih.gov/pmc/articles/PMC3082144/, Apr. 1, 2012, 31 pages.

* cited by examiner

US 10,438,118 B2

VERIFICATION BY METAMORPHIC TESTING OF APPLICATIONS THAT UTILIZE ARTIFICIAL INTELLIGENCE

RELATED APPLICATION(S)

This application claims priority under 35 U.S.C. § 119 to Indian Provisional Patent Application No. 201741035749, filed on Oct. 9, 2017, the content of which is incorporated by reference herein in its entirety.

BACKGROUND

Machine learning is a field of computer science that gives computers the ability to learn without being explicitly programmed. An application that uses machine learning may generate predictions and/or classifications of information by using a data model to process incoming data. Application testing involves processes for evaluating an application to ensure that the application satisfies requirements imposed during a development of the application, such as verification requirements (e.g., to ensure the application performs desired functions), validation requirements (e.g., to ensure that a way in which the application is verified is legitimate), and/or the like. For example, verification of the application may be performed by performing unit tests or similar types that are able to compare differences between a given input and an expected output.

SUMMARY

According to some possible implementations, a method may include receiving, by a device and from a user device, a request to verify a machine learning (ML) application. Verification of the ML application may be performed using a metamorphic testing procedure. The method may include determining, by the device, a type of ML process used by the ML application after receiving the request. The method may include selecting, by the device, one or more metamorphic relations (MRs), that are to be used for performing the metamorphic testing procedure, based on the type of ML process used by the ML application. The method may include receiving, by the device, test data that is to be used to test the ML application. The test data may be based on the one or more MRs. The method may include performing, by the device and by using the one or more MRs and the test data, the metamorphic testing procedure to verify one or more aspects of the ML application. The method may include generating, by the device, a report that includes verification results data indicating whether the one or more aspects of the ML application have been verified. The method may include providing, by the device, the report for display on an interface of the user device.

According to some possible implementations, a device may include one or more memories, and one or more processors, communicatively coupled to the one or more memories, to receive, from a user device, a request to verify a machine learning (ML) application. Verification of the ML application may be performed using a metamorphic testing procedure. The one or more processors may determine a type of ML process used by the ML application after receiving the request. The one or more processors may determine one or more types of data used by the ML application after receiving the request. The one or more processors may select one or more metamorphic relations (MRs), that are to be used for performing the metamorphic testing procedure, based on the type of ML process used by the ML application. The one or more processors may generate test data that is to be used to test the one or more MRs. The one or more processors may configure an environment that will support performance of the metamorphic testing procedure after selecting the one or more MRs. The one or more processors may verify one or more aspects of the ML application by using the one or more MRs and the test data to perform the metamorphic testing procedure in the environment. The one or more processors may generate a report that includes verification results data indicating whether the one or more aspects of the ML application have been verified. The one or more processors may provide the report to the user device.

According to some possible implementations, a non-transitory computer-readable medium may store instructions that include one or more instructions that, when executed by one or more processors of a device, cause the one or more processors to receive, from a user device, a request to verify a machine learning (ML) application. Verification of the ML application may be performed using a testing procedure. The one or more instructions may cause the one or more processors to determine a type of ML process used by the ML application after receiving the request. The one or more processors may select one or more properties, that are to be used for performing the testing procedure, based on at least one of: the type of ML process used by the ML application, a first indication of whether source code of the ML application has been made accessible to the device, or a second indication of whether training data used to train the ML application has been made accessible to the device. The one or more instructions may cause the one or more processors to generate test data that is to be used to test the one or more properties. The one or more instructions may cause the one or more processors to perform, by using the one or more properties and the test data, the testing procedure to selectively verify one or more aspects of the ML application. The one or more instructions may cause the one or more processors to generate a report that includes verification results data indicating whether the one or more aspects of the ML application have been verified. The one or more instructions may cause the one or more processors to provide the report for display on an interface of the user device.

DETAILED DESCRIPTION

Figure 1A:
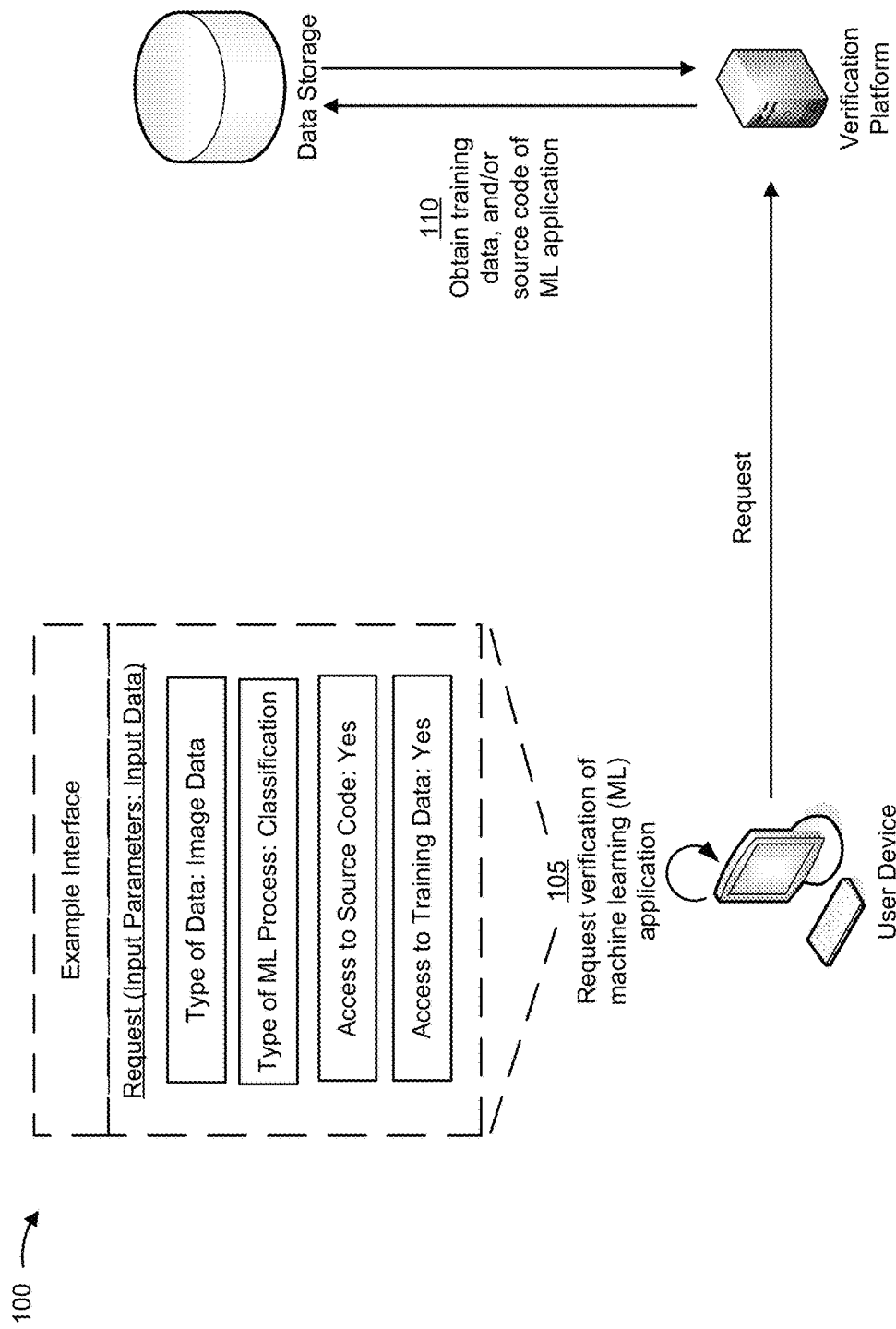
FIGS. 1A-1E are diagrams of an example implementation described herein.

The following detailed description of example implementations refers to the accompanying drawings. The same reference numbers in different drawings may identify the same or similar elements.

Artificial intelligence describes different ways that a machine interacts with a world around the machine. Through advanced, human-like intelligence (e.g., provided by software and hardware) an artificial intelligence device can mimic human behavior or perform tasks as if the artificial intelligence device was human. Machine learning is an approach, or a subset, of artificial intelligence, with an emphasis on learning rather than just computer programming. In machine learning, a device utilizes complex algorithms to analyze a massive amount of data, recognize patterns among the data, and make predictions without requiring a person to program specific instructions into the device's software. Deep learning is a subset of machine learning and utilizes massive amounts of data and computing power to simulate deep neural networks. Essentially, these networks imitate a human brain's connectivity, classifying data sets, finding correlations between the data sets, and/or the like. With newfound knowledge (acquired without human intervention), deep learning can apply the knowledge to other data sets.

Machine learning and artificial intelligence have found great success in practical applications. Computer vision, speech recognition, and language translation have all seen a near human level performance with the help of machine learning and artificial intelligence. In the near future, many business applications will also utilize some form of machine learning and/or artificial intelligence.

However, testing such applications is extremely challenging and very expensive with current testing methodologies. For example, to verify that a machine learning (ML) application satisfies a set of requirements (e.g., quality requirements, functional requirements, and/or the like), a tester may perform unit testing, functional testing, and/or the like. As an example, a tester may perform a unit test by supplying input to the ML application to check whether an output matches an expected output for that particular unit test. However, because the ML application may be expected to receive a large amount of variance in types of input data (e.g., different types of input data may be in the millions, billions, trillions, or more), the tester is unlikely to be able to perform unit tests to test each of the different variances.

Furthermore, in many ML applications, an output for a particular input may be unknown. As such, a human tester would be objectively unable to perform a unit test to verify that the particular input produces the output. Moreover, a tester identifying an incorrect prediction or classification made by the ML application does not necessarily indicate a presence of an error or a bug. For example, if the ML application is accurate 99% of the time, and a tester identifies an incorrect prediction or classification, a developer may not want to change the ML application for risk of the change decreasing overall accuracy of the ML application. As such, attempting to have a human user perform unit tests would be ineffective (in addition to also being expensive due to the massive number of tests that would need to be performed).

Some implementations, described herein, may provide a verification platform to perform a metamorphic testing procedure to verify a machine learning (ML) application. For example, the verification platform may receive, from a user device, a request to verify the ML application. The metamorphic testing procedure may be used to verify one or more aspects of the ML application (e.g., functional requirements, quality requirements, and/or the like). In this case, the request may include a ML process identifier that identifies a type of ML process that is used by the ML application (e.g., a ML process using a classification technique, a ML process using a clustering technique, a ML process using a regression technique, and/or the like) and a data type identifier that identifies a type of data used by the ML application (e.g., image data, text data, audio data, multimedia data, etc.).

Furthermore, the verification platform may obtain test data, training data, and/or source code of the ML application (e.g., source code used to execute one or more data models) which may be used for the metamorphic testing procedure. Additionally, the verification platform may identify one or more metamorphic relations (MRs) that are to be used for the metamorphic testing procedure. For example, the verification platform may select one or more MRs based on the type of ML process used by the ML application (e.g., different types of ML processes may need different MRs), based on whether source code of the ML application was made available to the verification platform (e.g., some MRs may be testable only with access to the source code), based on whether the training data was made available to the verification platform, and/or the like.

In some implementations, the verification platform may generate test data based on the one or more MRs. Additionally, the verification platform may configure an environment (e.g., a virtual environment) that may be used to perform the metamorphic testing procedure. For example, the verification platform may select a type of database, one or more software libraries that are to be used to support the metamorphic testing procedure, and/or the like, based on the type of data used by the ML application. As such, the verification platform may perform the metamorphic testing procedure in the environment to verify the ML application. Additionally, the verification platform may generate a report that includes verification results data indicating which of the one or more MRs have been verified and may provide the report to the user device.

In this way, the verification platform improves performance of the user device by enabling the user device to quickly, easily, and cheaply verify and test whether a ML application functions correctly before implementing and executing the ML application on the user device. Additionally, the user device conserves resources (e.g., processor resources, memory resources, and/or the like) that would otherwise be wasted executing an improperly functioning ML application. Moreover, the verification platform conserves processing resources and/or network resources relative to an inferior platform that is unable to generate appropriate MRs to test the ML application.

Furthermore, several different stages of the process for verifying the ML application are automated, which removes human subjectivity and waste from the process, and which improves speed and efficiency of the process and conserves computing resources (e.g., processor resources, memory resources, and/or the like). For example, by automating verification of the ML application, the user device does not need to execute hundreds, thousands, millions, or more, test scenarios to verify the ML application (e.g., as would be required with current testing methodologies). Additionally, implementations described herein use a rigorous, computerized process to perform tasks or roles that were not previously performed or were previously performed using subjective human intuition or input.

FIGS. 1A-1E are diagrams of an example implementation 100 described herein. Example implementation 100 may include a user device, a data storage, and a verification platform. As shown herein, the verification platform may verify a machine learning (ML) application by performing a metamorphic testing procedure. The metamorphic testing procedure may be used to verify one or more aspects of the ML application. For example, the metamorphic testing procedure may verify one or more aspects of the ML application (e.g., a functional requirement of the ML application, a quality requirement of the ML application, and/or the like).

As shown in FIG. 1A, and by reference number 105, a user may interact with an interface of the user device to input a request to verify the ML application. For example, an interface (e.g., a web interface, an application interface, etc.) of the user device may display a menu for submitting requests to verify ML applications. In this case, the user may interact with the menu to provide input data that may be used as parameters of the request. The input data may include data indicating a type of data used by the ML application, data indicating a type of ML process used by the ML application, data indicating whether source code of the ML application is to be made available for the verification, data indicating whether training data is to be made available for the verification, and/or the like. When the user submits the request, the user device may provide the request to the verification platform for further processing.

In some implementations, the request include data indicating the type of data used by the ML application. The type of data used by the ML application may be image data, text data, audio data, multimedia data, and/or the like. This may allow the verification platform to select specific tools that may be used in an environment (e.g., a virtual environment, a sandbox environment, and/or the like) used for performing the metamorphic testing procedure. For example, whether the ML application uses image data or text data might influence a type of database used within the environment, which software libraries are used within the environment, and/or the like.

In some implementations, the request may include data indicating the type of ML process. For example, the verification platform may have access to a set of metamorphic relations (MRs) that are used for performing metamorphic testing procedures of various ML applications. To determine which of the set of MRs to select for the metamorphic testing procedure, the verification platform may need to identify the type of ML process used by the ML application. The type of ML process may be a first type of ML process that utilizes a classification technique, a second type of ML process that utilizes a clustering technique, a third type of ML process that utilizes a regression technique, and/or the like.

In some implementations, different MRs may be needed for different sub-types of ML processes within a particular type of ML process. In these cases, the sub-types may be provided as part of the request. As an example, a ML process that utilizes a classification technique may classify data using a support vector machine (SVM), a deep learning technique, such as a residual neural network (ResNet), and/or the like. Because different MRs may be needed for a ML application that uses SVM and for a ML application that uses ResNet, the sub-type may need to be provided as part of the request.

In some implementations, the types of machine learning processes may be segmented in other ways. For example, the type of machine learning process may be a first type of ML process that uses supervised ML, a second type of ML process that uses unsupervised ML, a third type of ML that uses reinforcement ML, and/or the like.

In some implementations, the verification platform may perform other types of testing procedures (e.g., instead of the metamorphic testing procedure). In this case, the verification platform may have access to other types of properties needed to perform the other types of testing procedures.

Additionally, or alternatively, the request may include data indicating whether the verification platform is allowed to access source code of the ML application and/or data indicating whether the verification platform is allowed to access training data of the ML application. Similar to that described above, to determine which of the set of MRs to select for the metamorphic testing procedure, the verification platform may need data indicating whether the source code of the ML application and/or the training data are to be accessible when performing the metamorphic testing procedure. The source code of the ML application may include any code used to execute instructions of the ML application. In some implementations, the source code may include code for one or more data models that have been trained using ML. The training data of the ML application may include any training data used while training one or more data models of the ML application. For example, the training data may include historical data, scored historical data (e.g., which may be scored to make a prediction, classification, and/or the like), one or more threshold values, and/or the like.

In some implementations, the verification platform may receive a request that includes the data indicating the type of data used by the ML application, data indicating the type of ML process, data indicating that the source code will be available for the metamorphic testing procedure, and/or data indicating that the training data will be available for the metamorphic testing procedure.

In some implementations, the verification platform may receive a request that includes only one or more of the input data mentioned above. For example, if developers of an organization that use services of the verification platform have created a data model using open source code and known training data, the source code and the known training data may be available to the verification platform while performing the metamorphic testing procedure. As another example, if the developers used a data model created by a third-party and trained the data model on known training data, the training data may be available to the verification platform (but not the source code).

As another example, if the developers created a data model but used training data of a third-party, the source code (but not the training data) may be made available to the verification platform. As another example, if the developers have been given a pre-trained application from a third-party organization for independent verification and/or validation, the verification platform may be unable to access the source code and the training data.

In some implementations, the verification platform may determine the type of data and/or the type of ML process. For example, the verification platform may determine the type of data and/or the type of ML process based on the request (e.g., as described above) and/or by analyzing the training data and/or the source code of the ML application. As an example, the verification platform may analyze the training data to identify the type of data used by the ML application. As another example, the verification platform may analyze the source code to determine the type of ML process used by the ML application.

As shown by reference number 110, the verification platform may obtain training data and/or source code of the ML application. For example, the verification platform may obtain training data and/or source code of the ML application based on the input data included in the request.

In some implementations, the verification platform may obtain the training data from the data storage. For example, the training data may be stored in a manner that is accessible to the verification platform (e.g., publicly accessible, accessible using a key, etc.), and the verification platform may obtain the training data based on receiving a request indicating that the training data has been made accessible to the verification platform. This may allow the verification platform to obtain (e.g., download) the training data from the data storage. In some implementations, the user device may provide the training data to the verification platform (e.g., as part of the request, in addition to the request, etc.).

Additionally, or alternatively, the verification platform may obtain source code of the ML application from the data storage (which may be the same data storage that stores the training data or a different data storage). For example, the source code may be stored in a manner that is accessible to the verification platform, and the verification platform may obtain the source code based on receiving a request indicating that the source code has been made accessible to the verification platform. This may allow the verification platform to obtain (e.g., download) the source code from the data storage. In some implementations, the user device may provide the source code to the verification platform (e.g., as part of the request, in addition to the request, etc.).

In this way, the verification platform receives a request to verify a ML application.

Figure 1B:
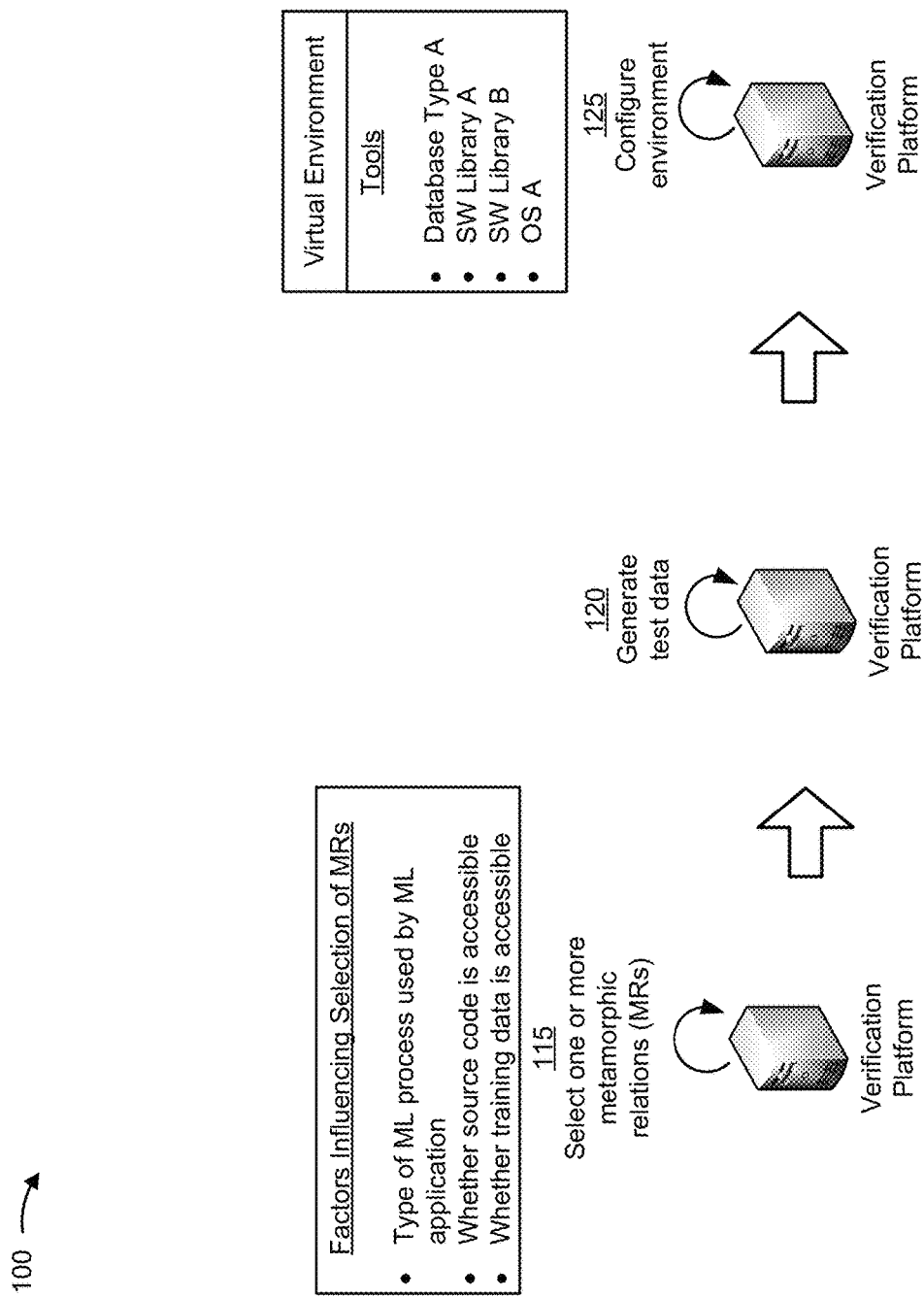

As shown in FIG. 1B, the verification platform may perform preliminary actions needed to perform the metamorphic testing procedure. As shown by reference number 115, the verification platform may select one or more metamorphic relations (MRs) to be used for the metamorphic testing procedure. For example, the verification platform may select one or more MRs based on the input data provided (or determined) from the request.

In some implementations, a data structure may store a set of MRs that are used to perform metamorphic testing procedures on various ML applications. For example, the data structure may store MRs in association with particular types of ML processes, in association with indicators of whether source code is available during metamorphic testing, in association with indicators of whether training data is available during metamorphic testing, and/or the like.

The set of MRs may include a first MR for testing permutations of a class label of a class associated with the ML application, a second MR for testing permutations of one or more features used to train the ML application, a third MR for testing permutations that modify the one or more features by a constant value, a fourth MR for testing permutations of an order in which the one or more features are used to train the ML application, a fifth MR for testing scaling of the one or more features, a sixth MR for testing normalization of the one or more features, and/or the like. The set of MRs are provided by way of example. In practice, any number of different MRs may be used depending on the type of ML process and whether the source code and/or training data are available for metamorphic testing.

In some implementations, the set of MRs and/or associations between particular MRs and particular ML applications may be established by a team of human experts using complex mathematical proofs. For example, to identify MRs that are appropriate for testing a ML application that classifies data using a support vector machine (SVM), a data scientist made hypotheses that particular MRs were appropriate tests to use for the ML application, and performed extensive research and testing to create mathematical proofs to prove that the particular MRs are in fact a valid way to test the ML application. Additionally, several examples are provided below that illustrate groups of MRs that have been validated by human experts (e.g., using the complex mathematical proofs). In practice, it is to be understood that the data structure used herein may establish associations between MRs and all (or some) ML applications (e.g., ML applications that use any number of different types of ML processes), such as by having human experts create MRs and/or validate that the MRs are to be used for particular ML applications.

In some implementations, the verification platform may select the one or more MRs by searching the data structure using a search query that includes input data associated with the request. Continuing with the example shown in FIG. 1A, assume the verification platform determines that that the ML application uses image data, a classification technique, such as a technique using a support vector machine (SVM), and that the source code and training data of the ML application are available for use during metamorphic testing. In this example, the verification platform may search the data structure to obtain MRs stored in association with ML applications that classify images using a classification technique, such as a first MR for testing permutations of training and test features, a second MR for testing an order in which training data values were used to train a data model of the ML application, a third MR for testing linear scaling of training and test features (however, if a linear kernel is used for the SVM, only linear scaling of test features may be tested, if a radial basis function (RBF) kernel is used for the SVM, linear scaling of both training and test features may be tested), and, if the RBF kernel is used for the SVM, a fourth MR may be used to test shifting value positions of the training and test features by a constant.

However, different MRs may be needed to test the ML application if the source code and/or the training data are unavailable. For example, assume the verification platform determines that the ML application uses image data and the classification technique uses SVM, but that the source code is unavailable. In this example, the verification platform may search the data structure to obtain MRs that are stored in association with both ML applications that classify images using the classification technique and an indicator that the source code is unavailable, such as a first MR for testing modifications of an order in which training data values are trained, a second MR for testing permutations of class labels used by the SVM, and a third MR for testing permutations of features. Conversely, if the source code were available but the training data was unavailable, each of these MRs may not be applicable or useful for testing the ML application. As discussed above, the relevancy of using particular MRs to test particular ML applications may be determined by human experts, such that the data structure may establish associations between the particular MRs and the particular ML applications.

To provide one more example, assume the verification platform determines that the ML application uses image data and a deep learning-based image classifier such as ResNet, and that the source code and training data of the ML application are available for metamorphic testing. As such, the verification platform may search the data structure to obtain MRs stored in association with ML applications that use deep learning-based image classifiers, such as a first MR for testing permutations of input channels for training and test data, a second MR for testing permutations of a convolution operation order for training data and test data, a third MR for testing permutations of files included in the training data, a fourth MR for testing normalization of the test data, and a fifth MR for testing scaling of the test data by a constant.

In this way, the verification platform selects one or more MRs that are appropriate to use for metamorphic testing of the ML application. By selecting MRs that are appropriate to use for metamorphic testing of the ML application, the verification platform conserves processing resources and/or network resources that would otherwise be expended testing inappropriate MRs (e.g., MRs that are not a good fit for testing the ML application, MRs that have not been validated by human experts, and/or the like).

As shown by reference number 120, the verification platform may generate test data. For example, the verification platform may generate test data that may be used as part of a set of test cases used to test the one or more MRs. The test data may include groups of input values (e.g., groups of two or more) that may be used for testing particular MRs (e.g., by executing the ML application with the groups of input values). In some implementations, the test data described herein may be a subset of the training data (e.g., because the test data may involve retraining the data model used by the ML application). Additionally, or alternatively, the test data may be randomly generated such that the randomly generated test data includes values similar to the training data.

In some implementations, the verification platform may generate test data based on a selected MR. For example, assume a MR indicates to test permutations of training and test features. In this case, the verification platform may identify features used to train a data model used by the ML application (e.g., the features may be provided as part of the training data) and may generate one or more permutations of the identified features that may be used to test the selected MR.

As an example, the verification platform may generate test data for a MR indicating to test a permutation of a feature of an image that is received as input to the ML application. In this example, the verification platform may generate permutations of the locations of the feature by generating copies of the image facing different directions (e.g., by rotating the image 90 degrees, 180 degrees, 270 degrees, and/or the like, relative to the original image). This may allow the verification platform to test the MR by determining whether the data model is still able to output a correct classification of the image when the input to the ML application is a permutation of the image.

As another example, the verification platform may generate test data for a MR indicating to test an order in which image data is used to train the data model. In this example, the verification platform may generate varied orders of image data (i.e., training data values) and may retrain copies of the data model using the varied orders of the image data. This may allow the verification platform to test the MR by executing the copies of the data model to ensure that varying an order in which the image data is used to train the data model does not influence the output of the data model.

As another example, the verification platform may generate test data for a MR indicating to test linear scaling of features associated with the image data. In this example, the verification platform may multiply all (or some) instances of a feature associated with an image by a constant value and may retrain the data model using the multiplied feature values. As a particular example, the verification platform may multiple every pixel value by a constant (e.g., a constant greater than zero). This may allow the verification platform to test the MR by verifying that changing the feature by a constant value did not influence the output of the data model.

In some implementations, the verification platform may generate the training data in an environment used to support metamorphic testing of the ML application (as opposed to generating the training data prior to configuration of the environment, as is shown below). In some implementations, the verification platform may receive test data that has been generated by another device. For example, another device may generate test data in a manner similar to that described above, and the other device may provide the test data to the verification platform.

In some implementations, the test data generated by the verification platform and/or the training data obtained from the data storage may include millions of data points, billions of data points, or more. As such, a human may be objectively unable to process the data.

By generating test data based on the one or more selected MRs, the verification platform conserves processing resources and/or network resources that would otherwise be expended generating test data for other MRs that may be inappropriate MRs to use for metamorphic testing of the ML application (e.g., MRs that are not a good fit for testing the ML application, MRs that have not been validated by teams of human experts, and/or the like).

As shown by reference number 125, the verification platform may configure an environment that is to be used for the metamorphic testing procedure. For example, the verification platform may configure an environment (e.g., a virtual environment, a sandbox environment, and/or the like) with one or more tools used to perform the metamorphic testing procedure. The one or more tools may include a particular type of database, a particular group of software libraries, a particular operating system, and/or the like.

In some implementations, the verification platform may configure an environment to support metamorphic testing based on the type of data used by the ML application and/or based on the type of ML process used by the ML application. For example, one or more tools that are to be used within the environment may vary depending on the type of data being used by the ML application and/or the type of ML process used by the ML application. In this case, the verification platform may obtain the one or more tools by searching a data structure that associates tools with types of data and/or types of ML processes used by various ML applications. By configuring the environment based on the type of data used by the ML application and/or based on the type of ML process used by the ML application, the verification platform conserves processing resources and/or network resources that would otherwise be expended configuring an environment to support tools that are not needed for metamorphic testing of the ML application, to support tools that are incapable of performing metamorphic testing of the ML application, to support tools that are capable of performing ineffective metamorphic testing of the ML application, and/or the like.

In this way, the verification platform performs preliminary actions needed for metamorphic testing.

Figure 1C:
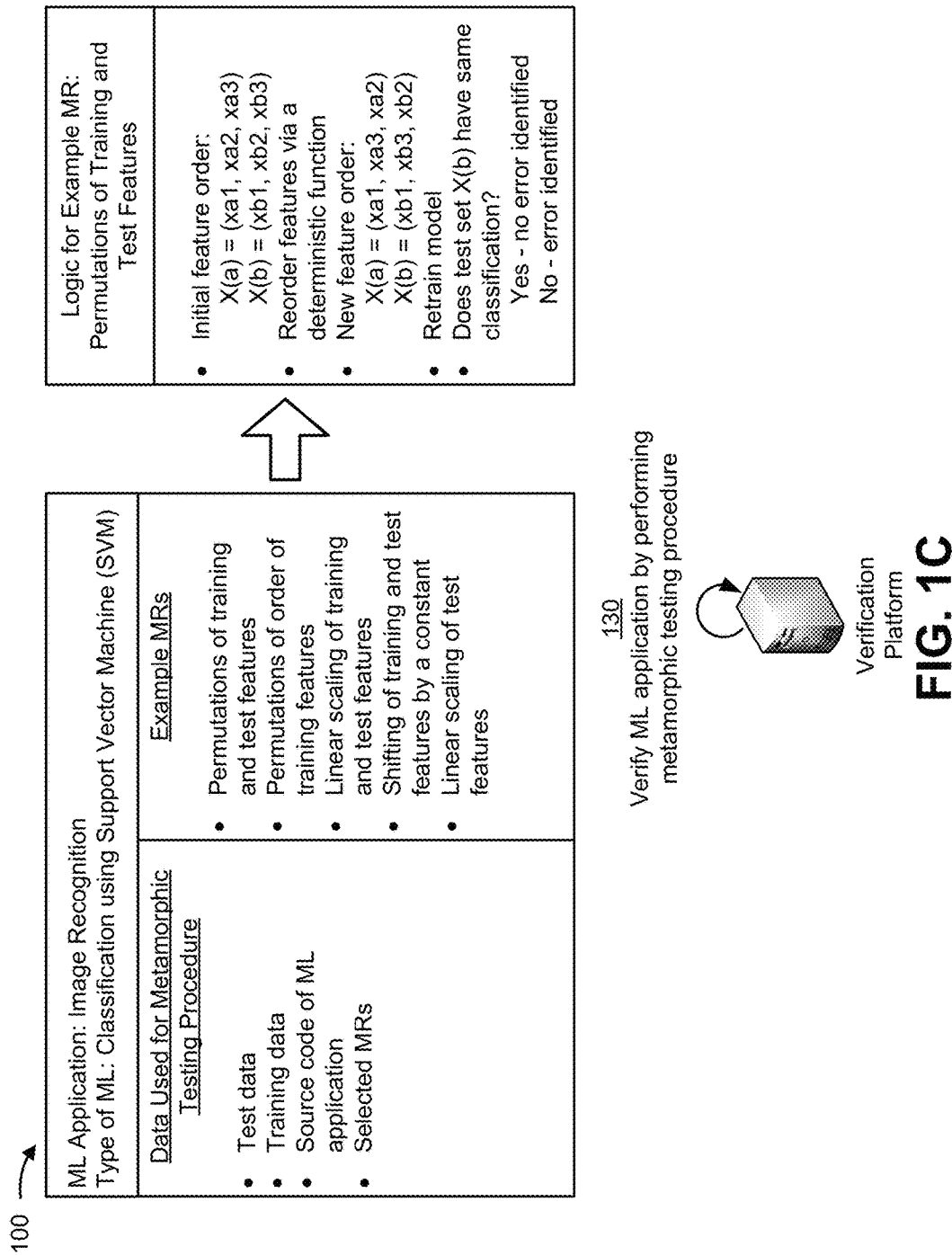

As shown in FIG. 1C, and by reference number 130, the verification platform may verify the ML application by performing the metamorphic testing procedure. For example, the verification platform may verify one or more aspects of the ML application by performing the metamorphic testing procedure in the environment. As used here, verification of one or more aspects of the ML application may refer to verification of any aspect of the ML application that is tested by the one or more MRs. As an example, the first MR may test permutations of training and test features. As shown in FIG. 1C, if the results are the same on original and permuted data, there is no indication of an error in the ML application. Conversely, if the results are different, this may indicate an error exists in the ML application.

In some implementations, the verification platform may, as part of the metamorphic testing procedure, test a first MR. Continuing with the examples described above, the verification platform may test the first MR by testing permutations of a feature of an image (e.g., rotating the image by 90 degrees, etc.) that is used to train the data model. In this example, the verification platform may test permutations of the feature by providing permutations of the original image (e.g., the image prior to being rotated) as input to the data model to verify whether the data model is able to output the same classification as the data model. Similarly, the verification platform might retrain copies of the data model using permutations of the original image (and not the original image) and may provide the original image as input to the copies of the data model to verify whether the copies of the data model are still able to output the correct classification.

As another example, the verification platform may, as part of the metamorphic testing procedure, test the second MR. Continuing with the examples described above, assume the verification platform generates varied orders of image data and retrains copies of the data model using the varied orders of the image data. In this case, the verification platform may test the second MR by providing the original image data as an input to the copies of the data model to ensure that the varied orders of the image data do not influence the classification made by the data model.

As another example, the verification platform may, as part of the metamorphic testing procedure, test the third MR. Continuing with the examples described above, assume the verification platform generates instances of an image whose pixels have been multiplied by a constant value (<0) and that copies of the data model have been retrained using the instances of the image. In this case, the verification platform may test the third MR by providing the original image as input to the copies of the data model to ensure that the images with the multiplied pixels do not influence (e.g., change) the classification made by the data model.

In some implementations, the verification platform may selectively verify the one or more aspects of the ML application, of a set of aspects that are capable of being verified. For example, the set of aspects may correspond to the set of the MRs described elsewhere herein. As such, by verifying the one or more aspects (and not the entire set of aspects), the verification platform selectively verifies only aspects tested by the MRs that have been selected. This conserves processing resources and/or network resources relative to performing the metamorphic testing procedure to test the entire set of aspects of the ML application.

In this way, the verification platform verifies the ML application by performing the metamorphic testing procedure.

Figure 1D:
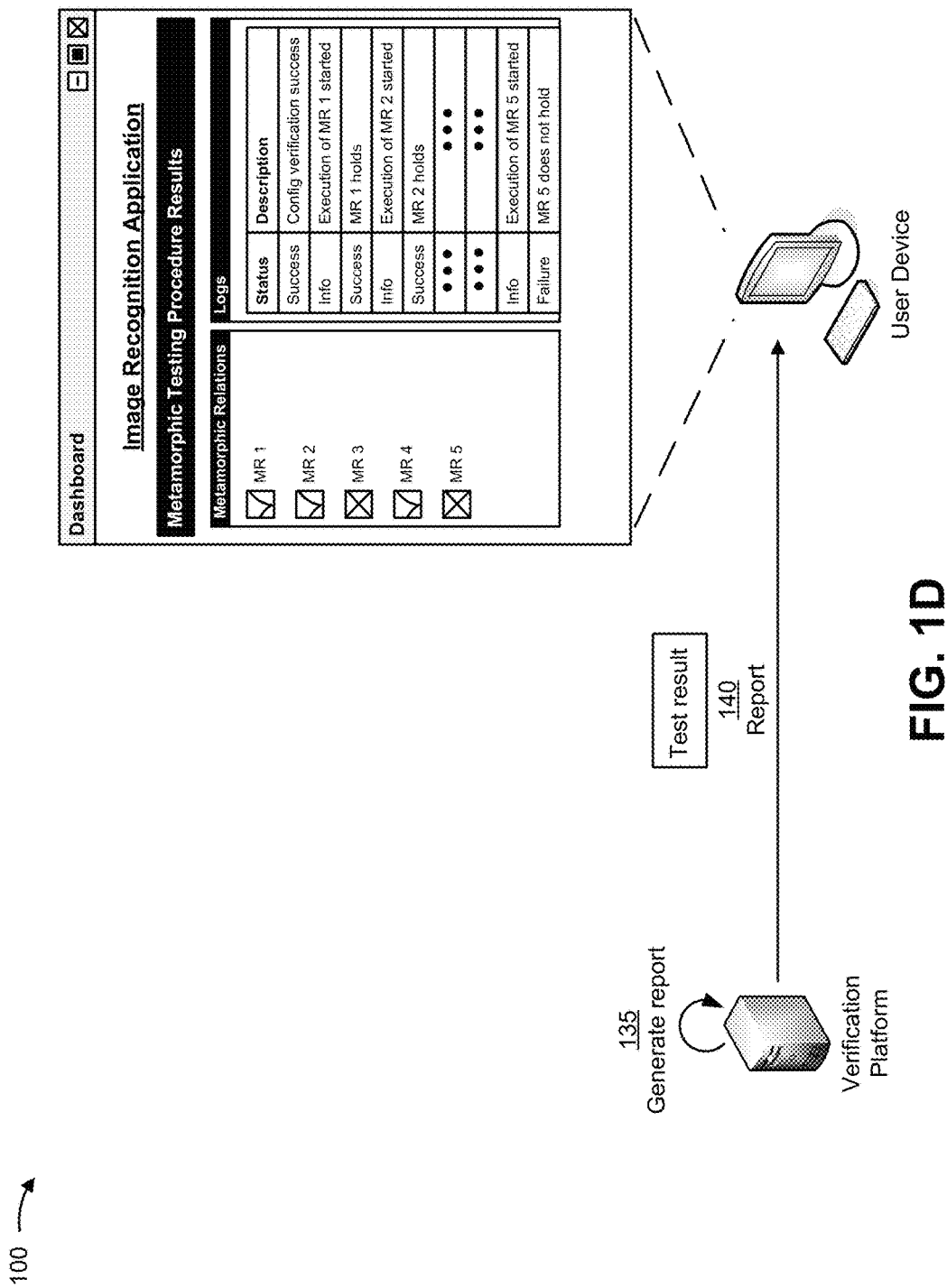

As shown in FIG. 1D, and by reference number 135, the verification platform may generate a report showing results of the metamorphic testing procedure. For example, the verification platform may generate a report that includes verification results data and data identifying one or more recommendations that may be performed based on the verification results data. The verification results data may indicate whether one or more aspects of the ML application have been verified. The data identifying the one or more recommended actions may include data identifying a recommendation to proceed with deployment of the ML application, data identifying a recommended action associated with correcting errors identified within the ML application, data identifying an action associated with improving accuracy of the data model used by the ML application, and/or the like.

In some implementations, the verification platform may generate the verification results data of the report. For example, the verification platform may process the output of the metamorphic testing procedure to generate verification results data that is formatted in a manner that may be displayed on a user interface of the user device.

In some implementations, the verification platform may generate, based on the verification results data, the data identifying the one or more recommended actions to perform. For example, if the verification results data indicates that the one or more aspects of the ML application have been successfully verified (or if a threshold number of the one or more aspects of the ML application have been successfully verified), the verification platform may generate a recommendation to proceed with deployment of the ML application.

In some implementations, the verification platform may apply a set of rules to determine an appropriate action to recommend. For example, if the verification results data indicates that an aspect of the ML application has not been verified (or that a threshold number of the one or more aspects of the ML application have not been successfully verified), the verification platform may apply a set of rules to determine an appropriate action to recommend. The set of rules may be used to identify an error within the ML application that needs to be corrected, to identify an inefficiency associated with the data model used by the ML application, to determine whether a MR failing the metamorphic testing procedure is caused by an error (e.g., a syntax error in the source code, a scoring metric of the data model, such as a weight, a formula, and/or the like, that needs to be adjusted), and/or the like.

As an example, assume a MR tests whether varying an order in which image data is used to train the data model influences the classifications made by the data model. Further assume the MR fails the metamorphic testing procedure (e.g., varying the order in which the image data is used to train the data model did influence the classifications made by the data model). In this example, the verification platform may reference a rule that is to be used when the MR fails the metamorphic testing procedure, which may identify a particular recommended action to perform when the MR fails the metamorphic testing procedure.

In some cases, a MR might fail the metamorphic testing procedure and might have multiple actions that could be performed to correct the error. In this case, the multiple actions might be associated with particular ranges of values output by the MR, such that the particular output of the MR may dictate which action the verification platform is to recommend.

As shown by reference number 140, the verification platform may provide the report for display on an interface of the user device. For example, as shown, the user device may present a user interface that includes a name of the ML application for the verification results data, and/or the one or more recommended actions to perform.

As shown by way of example, the user interface may include a section identifying whether the MRs (e.g., MR 1, MR 2, . . . , MR 5) hold true. For example, as shown, the first, second, and fourth MRs (e.g., MR 1, MR 2, and MR 4) hold true, and the third and fifth MR (e.g., MR 3 and MR 5) are false (i.e., indicating the ML application has some error(s) in its implementation due to the fact that MR3 and MR5 do not hold true). The user interface may also include a section identifying testing logs generated by the verification platform. The testing logs may include information associated with a configuration validation success, information associated with execution of the metamorphic relations, information associated with a success or failure associated with execution of each of the metamorphic relations, and/or the like. While not shown, the user interface may also include a section identifying the one or more recommended actions to perform.

In this way, the verification platform generates and provides the user device with a request indicating a result of the metamorphic testing procedure.

Figure 1E:
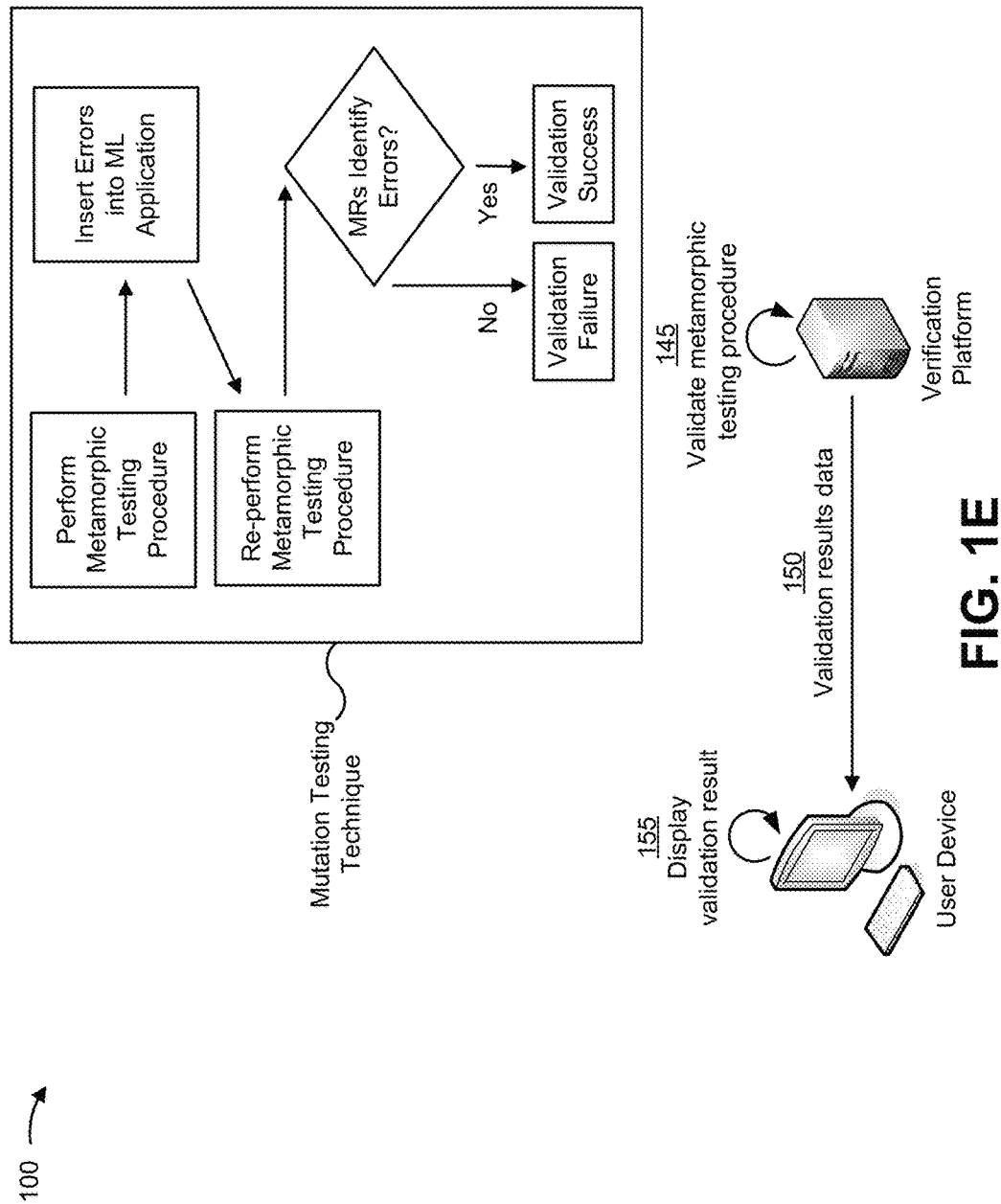

As shown in FIG. 1E, and by reference number 145, the verification platform may validate the metamorphic testing procedure. For example, the verification platform may validate the metamorphic testing procedure based on a trigger. To provide a few examples, the request provided by the user device may indicate to validate the metamorphic testing procedure and/or the report generated based on the metamorphic testing procedure, the verification platform may be configured to automatically validate the metamorphic testing procedure (e.g., based on completion of the procedure), the verification platform may be configured to validate the metamorphic testing procedure based on another type of trigger (e.g., if a threshold confidence level of the result of the procedure is not satisfied), and/or the like.

In some implementations, the verification platform may validate the metamorphic testing procedure using a mutation testing technique. The mutation testing technique may involve artificially inserting errors into the ML application and testing the ML application to determine whether the errors are detected (or detectable) by the metamorphic testing procedure. To accomplish this, the mutation testing technique may involve systematically changing lines of code (LoC) in the source code and generating multiple new source code files with variants of the LoC (i.e., the errors). The variations used may, in some cases, represent errors that are typically made by programmers.

As an example, an error may be inserted into the ML application that should cause a particular MR to fail. The verification platform may perform the metamorphic testing procedure before inserting the error into the ML application and may re-perform the metamorphic testing procedure after inserting the error. This may allow the verification platform to compare the results of the metamorphic testing procedure before and after inserting the error into the ML application. In this case, the verification platform may validate the MR based on whether re-performing the metamorphic testing procedure causes the MR to fail metamorphic testing (e.g., if the MR is functioning properly, the MR should fail metamorphic testing as a result of the inserted error). In some implementations, the verification platform may validate the metamorphic testing procedure based on whether a threshold number of errors that were artificially inserted into the ML application were detected.

Additionally, or alternatively, the verification platform may validate the metamorphic testing procedure using another type of technique. For example, the verification platform may validate the metamorphic testing procedure using a bootstrapping technique, a random sub-sampling technique, a re-substitution technique, a hold-out technique, a K-fold cross-validation technique, and/or the like.

As shown by reference number 150, the verification platform may provide validation results data to the user device. As shown by reference number 155, the user device may display the validation results data. In some implementations, the validation results data may be provided as part of the report.

In this way, the verification platform improves performance of the user device by enabling the user device to quickly, easily, and cheaply verify and test whether a ML application functions correctly before implementing and executing the ML application on the user device. Further, the efficacy of the verification platform itself can be automatically tested through mutation testing. Similar benefits may be found on another device if the other device is to implement and execute the ML application. Additionally, the user device conserves processing resources and/or network resources that would otherwise be wasted executing an improperly functioning ML application. Furthermore, the verification platform conserves processing resources and/or network resources relative to an inferior platform that incorrectly or ineffectively verifies the ML application.

As indicated above, FIGS. 1A-1E are provided merely as an example. Other examples are possible and may differ from what was described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of example implementations 100 may perform one or more functions described as being performed by another set of devices of example implementations 100.

Figure 2:
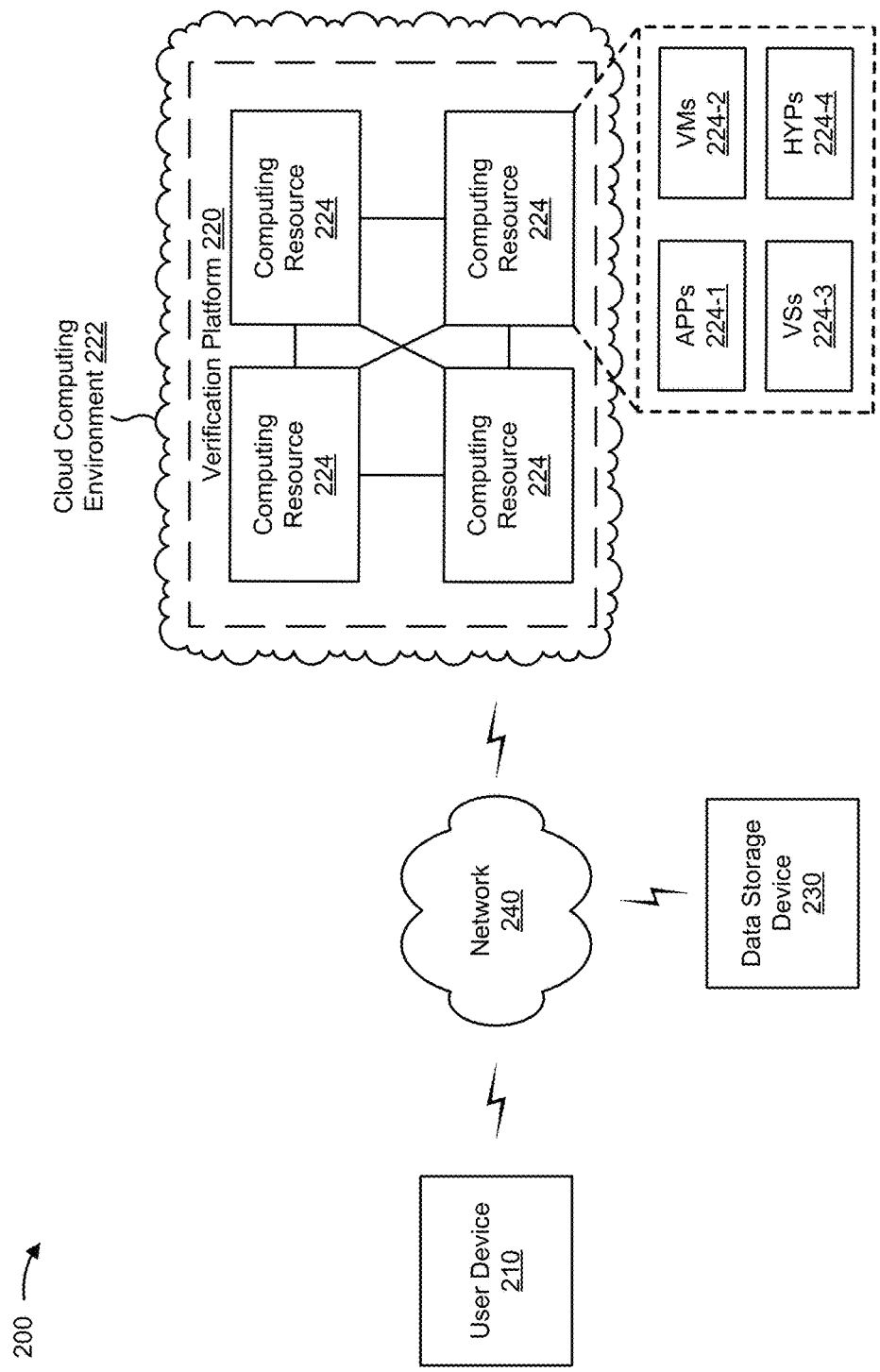
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a verification platform 220, a data storage device 230, and/or a network 240. Devices of environment 200 may interconnect via wired connections, wireless connections, or a combination of wired and wireless connections.

User device 210 includes one or more devices capable of receiving, generating, storing, processing, and/or providing information associated with a machine learning (ML) application. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a Global Positioning Satellite (GPS) device, a server device, a personal computer, or a similar type of device. In some implementations, user device 210 may be configured to execute the ML application. In some implementations, user device 210 may provide a request to verify the ML application to verification platform 220. In some implementations, user device 210 may receive information (e.g., a report indicating results of a metamorphic testing procedure, information indicating results of validating the metamorphic testing procedure, and/or the like) from verification platform 220.

Verification platform 220 includes one or more devices capable of receiving, storing, generating, determining, and/or providing information associated with the ML application. For example, verification platform 220 may include a server device (e.g., a host server, a web server, an application server, etc.), a data center device, or a similar device. In some implementations, verification platform 220 may verify the ML application that is to be executed on user device 210 or on another device. In some implementations, verification platform 220 may interact with data storage device 230 to obtain training data and/or source code of the ML application. In some implementations, verification platform 220 may interact with one or more devices to perform actions associated with correcting errors identified in the ML application and/or improving accuracy associated with a data model used by the ML application.

In some implementations, as shown, verification platform 220 may be hosted in a cloud computing environment 222. Notably, while implementations described herein describe verification platform 220 as being hosted in cloud computing environment 222, in some implementations, verification platform 220 may not be cloud-based (i.e., may be implemented outside of a cloud computing environment) or may be partially cloud-based.

Cloud computing environment 222 includes an environment that hosts verification platform 220. Cloud computing environment 222 may provide computation, software, data access, storage, etc. services that do not require end-user knowledge of a physical location and configuration of system(s) and/or device(s) that hosts verification platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host verification platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210 and/or data storage device 230. Application 224-1 may eliminate a need to install and execute the software applications on user device 210 and/or data storage device 230. For example, application 224-1 may include software associated with verification platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., user device 210 or an operator of verification platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Data storage device 230 includes one or more devices capable of receiving, storing, generating, and/or providing information associated with a ML application. For example, data storage device 230 may include a server device or a group of server devices. In some implementations, data storage device 230 may use one or more data structures to store information associated with the ML application, such as training data used to train a data model of the ML application, source code of the ML application, and/or the like.

Network 240 includes one or more wired and/or wireless networks. For example, network 240 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
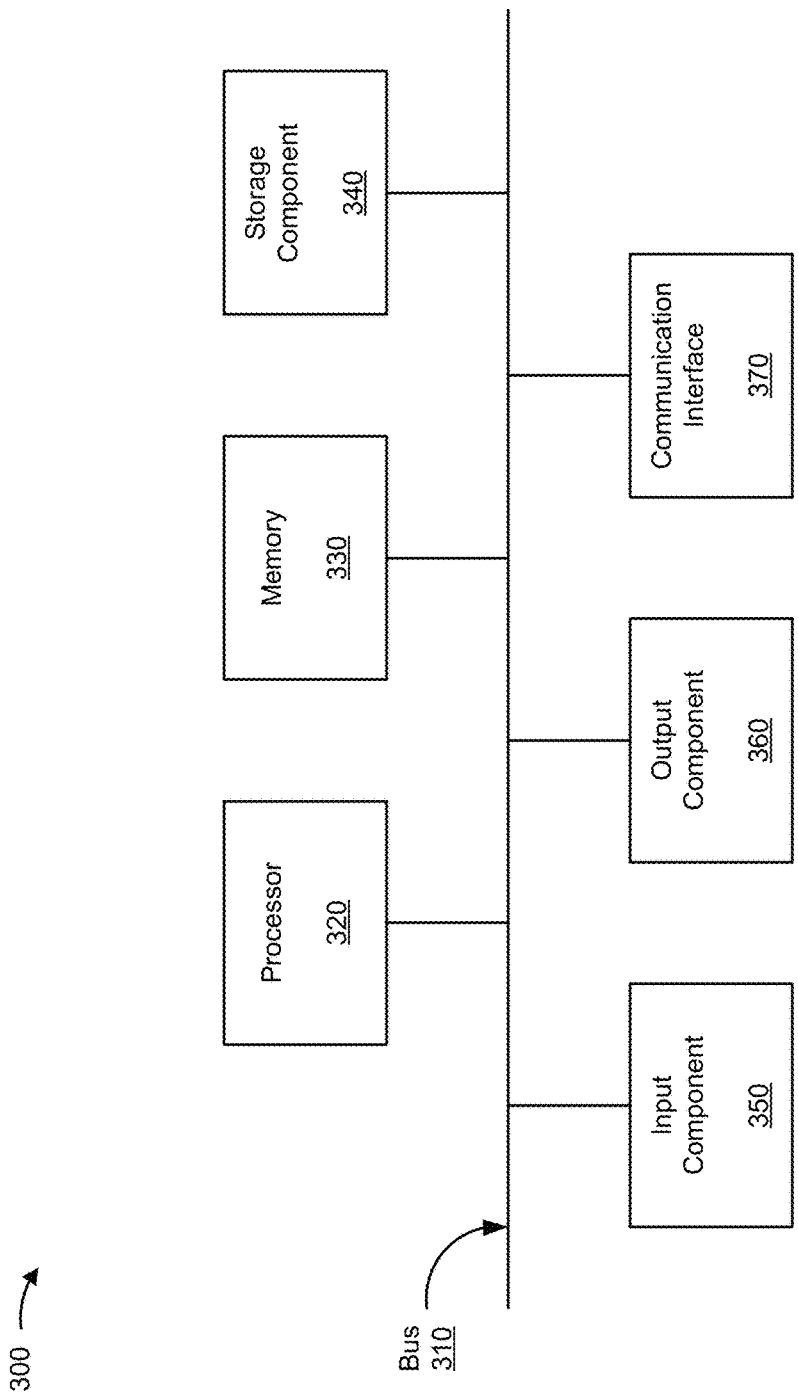
FIG. 3 is a diagram of example components of one or more devices of FIG. 2.

FIG. 3 is a diagram of example components of a device 300. Device 300 may correspond to user device 210, verification platform 220, computing resource 224, and/or data storage device 230. In some implementations, user device 210, verification platform 220, computing resource 224, and/or data storage device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
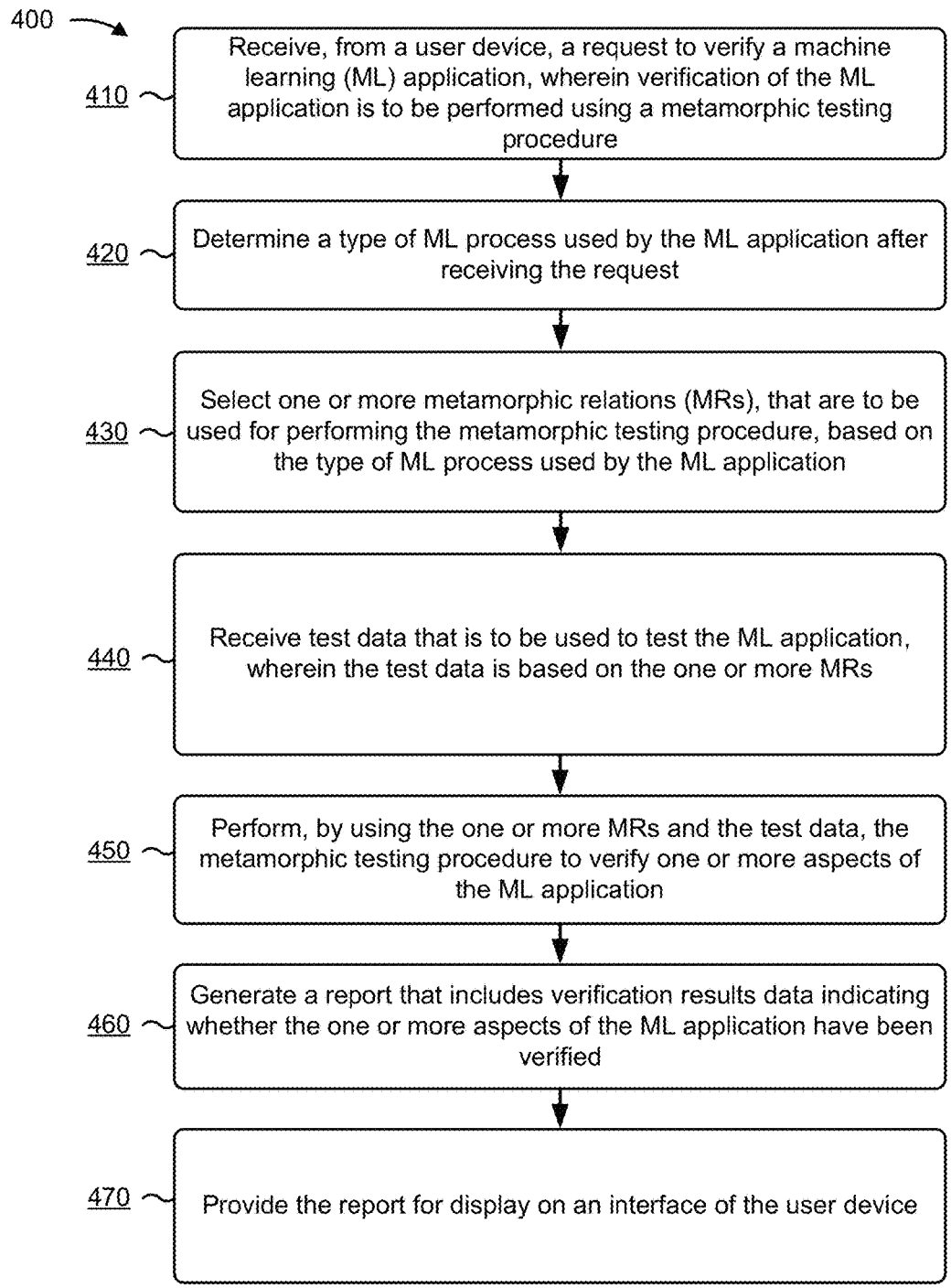
FIGS. 4-6 are flow charts of example processes for verifying a machine learning application by performing a metamorphic testing procedure.

FIG. 4 is a flow chart of an example process 400 for verifying a machine learning application by performing a metamorphic testing procedure. In some implementations, one or more process blocks of FIG. 4 may be performed by a verification platform (e.g., verification platform 220). In some implementations, one or more process blocks of FIG. 4 may be performed by another device or a group of devices separate from or including the verification platform, such as a user device (e.g., user device 210) and/or a data storage device (e.g., data storage device 230).

As shown in FIG. 4, process 400 may include receiving, by a device and from a user device, a request to verify a machine learning (ML) application, wherein verification of the ML application is to be performed using a metamorphic testing procedure (block 410). For example, the verification platform (e.g., verification platform 220, using computing resource 224, processor 320, memory 330, storage component 340, input component 350, communication interface 370, and/or the like) may receive, from a user device (e.g., user device 210), a request to verify a ML application, as described above with regard to FIGS. 1A-1E. In some implementations, verification of the ML application may be performed using a metamorphic testing procedure.

As further shown in FIG. 4, process 400 may include determining a type of ML process used by the ML application after receiving the request (block 420). For example, the verification platform (e.g., verification platform 220, using computing resource 224, processor 320, memory 330, storage component 340, and/or the like) may determine a type of ML process used by the ML application after receiving the request, as described above with regard to FIGS. 1A-1E.

As further shown in FIG. 4, process 400 may include selecting one or more metamorphic relations (MRs), that are to be used for performing the metamorphic testing procedure, based on the type of ML process used by the ML application (block 430). For example, the verification platform (e.g., verification platform 220, using computing resource 224, processor 320, memory 330, storage component 340, and/or the like) may select one or more metamorphic relations (MRs), that are to be used for performing the metamorphic testing procedure, based on the type of ML process used by the ML application, as described above with regard to FIGS. 1A-1E.

As further shown in FIG. 4, process 400 may include receiving test data that is to be used to test the ML application, wherein the test data is based on the one or more MRs (block 440). For example, the verification platform (e.g., verification platform 220, using computing resource 224, processor 320, memory 330, storage component 340, input component 350, communication interface 370, and/or the like) may receive test data that is to be used to test the ML application, as described above with regard to FIGS. 1A-1E. In some implementations, the test data may be based on the one or more MRs.

As further shown in FIG. 4, process 400 may include performing, by using the one or more MRs and the test data, the metamorphic testing procedure to verify one or more aspects of the ML application (block 450). For example, the verification platform (e.g., verification platform 220, using computing resource 224, processor 320, memory 330, storage component 340, and/or the like) may perform, by using the one or more MRs and the test data, the metamorphic testing procedure to verify one or more aspects of the ML application, as described above with regard to FIGS. 1A-1E.

As further shown in FIG. 4, process 400 may include generating a report that includes verification results data indicating whether the one or more aspects of the ML application have been verified (block 460). For example, the verification platform (e.g., verification platform 220, using computing resource 224, processor 320, memory 330, storage component 340, input component 350, communication interface 370, and/or the like) may generate a report that includes verification results data indicating whether the one or more aspects of the ML application have been verified, as described above with regard to FIGS. 1A-1E.

As further shown in FIG. 4, process 400 may include providing the report for display on an interface of the user device (block 470). For example, the verification platform (e.g., verification platform 220, using computing resource 224, processor 320, memory 330, storage component 340, output component 360, communication interface 370, and/or the like) may provide the report for display on an interface of the user device, as described above with regard to FIGS. 1A-1E.

Process 400 may include additional implementations, such as any single implementation or any combination of implementations described below and/or in connection with one or more other processes described elsewhere herein.

In some implementations, when selecting the one or more MRs, the verification platform may select the one or more MRs, from a plurality of MRs, based on the type of ML process used by the ML application and at least one of: a first indication of whether source code of the ML application has been made accessible to the device, or a second indication of whether training data used to train the ML application has been made accessible to the device.

In some implementations, the verification platform may determine, before selecting the one or more MRs, one or more types of data used by the ML application. In some implementations, the verification platform may select one or more tools to be used within an environment that will support performance of the metamorphic testing procedure. The one or more tools may be selected based on the one or more types of data used by the ML application. In some implementations, the verification platform may configure the environment to support the one or more tools. In some implementations, when verifying the one or more aspects of the ML application, the verification platform may use the one or more MRs and the test data to perform the metamorphic testing procedure in the environment.

In some implementations, the type of ML process used by the ML application may be a first type of ML process that uses classification, a second type of ML process that uses clustering, or a third type of ML process that uses regression. In some implementations, the one or more MRs may include at least one of: a first MR for testing permutations of a class label of a class associated with the ML application, a second MR for testing permutations of one or more features used to train the ML application, a third MR for testing permutations that modify the one or more features by a constant value, a fourth MR for testing permutations of an order in which the one or more features are used to train the ML application, a fifth MR for testing scaling of the one or more features, or a sixth MR for testing normalization of the one or more features.

In some implementations, the request may include an indication to validate the metamorphic testing procedure, and the verification platform may validate the metamorphic testing procedure by using a mutation testing technique to determine whether the one or more MRs identify particular errors that were inserted into the ML application for testing. In some implementations, when providing the report that includes the verification results data, the verification platform may provide, to the user device, the verification results data and validation results data identifying a result of validating the metamorphic testing procedure.

In some implementations, the ML application may include at least one aspect that is unable to be verified, and, when generating the report, the verification platform may generate one or more recommendations for correcting errors identified within the ML application or for improving accuracy of a data model used for the ML application. In some implementations, the verification platform may generate the report that includes the verification results data. The verification results data may include at least one of: first data identifying at least one aspect of the ML application that is unable to be verified, second data identifying a particular MR, of the one or more MRs, that failed the metamorphic testing procedure (e.g., that did not hold when the metamorphic testing procedure was executed), or third data identifying the one or more recommendations.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
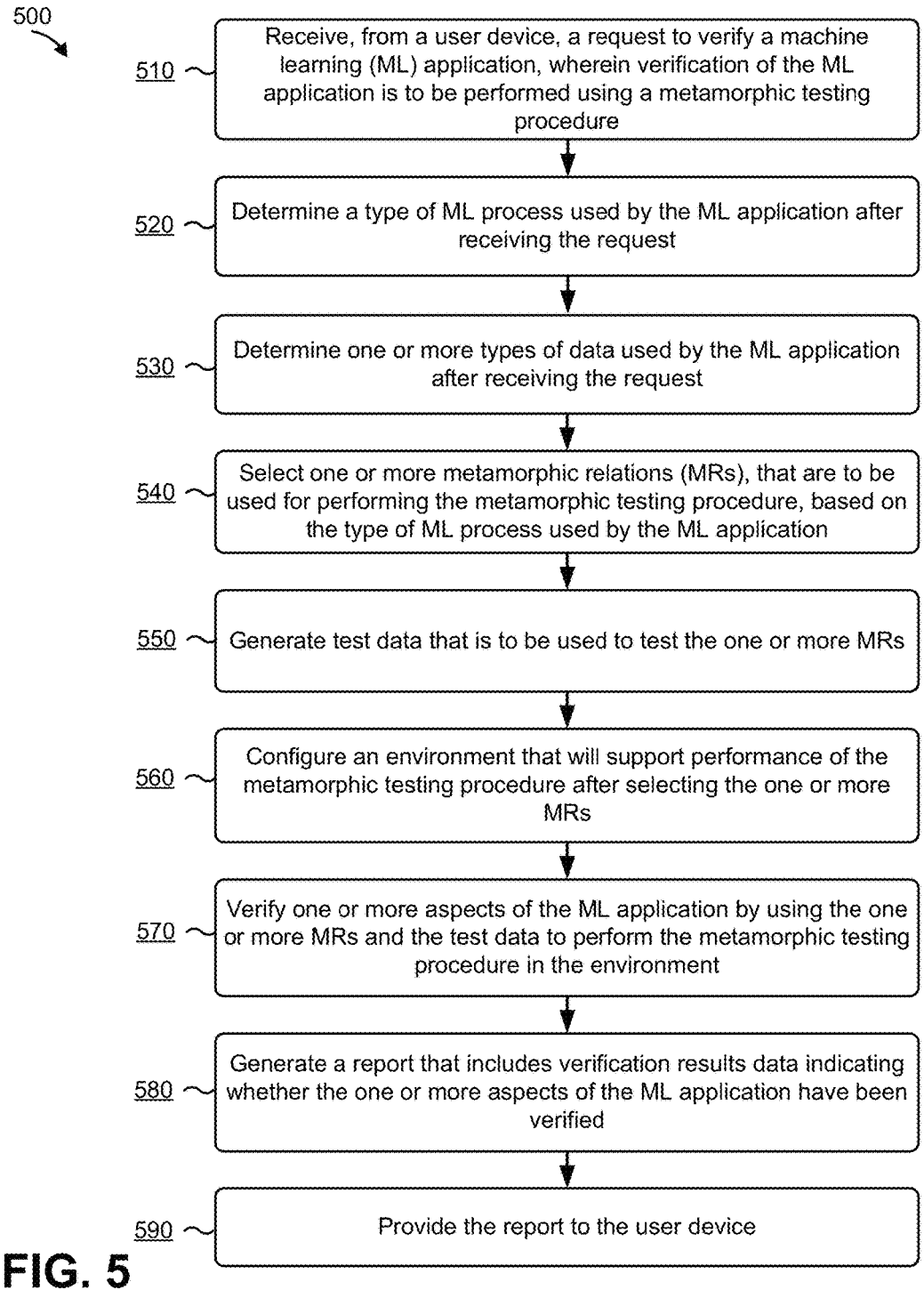

FIG. 5 is a flow chart of an example process 500 for verifying a machine learning application by performing a metamorphic testing procedure. In some implementations, one or more process blocks of FIG. 5 may be performed by a verification platform (e.g., verification platform 220). In some implementations, one or more process blocks of FIG. 5 may be performed by another device or a group of devices separate from or including the verification platform, such as a user device (e.g., user device 210) and/or a data storage device (e.g., data storage device 230).

As shown in FIG. 5, process 500 may include receiving, from a user device, a request to verify a machine learning (ML) application, wherein verification of the ML application is to be performed using a metamorphic testing procedure (block 510). For example, the verification platform (e.g., verification platform 220, using computing resource 224, processor 320, memory 330, storage component 340, input component 350, communication interface 370, and/or the like) may receive, from a user device (e.g., user device 210), a request to verify a ML application, as described above with regard to FIGS. 1A-1E. In some implementations, verification of the ML application may be performed using a metamorphic testing procedure.

As further shown in FIG. 5, process 500 may include determining a type of ML process used by the ML application after receiving the request (block 520). For example, the verification platform (e.g., verification platform 220, using computing resource 224, processor 320, memory 330, storage component 340, and/or the like) may determine a type of ML process used by the ML application after receiving the request, as described above with regard to FIGS. 1A-1E.

As further shown in FIG. 5, process 500 may include determining one or more types of data used by the ML application after receiving the request (block 530). For example, the verification platform (e.g., verification platform 220, using computing resource 224, processor 320, memory 330, storage component 340, and/or the like) may determine one or more types of data used by the ML application after receiving the request, as described above with regard to FIGS. 1A-1E.

As further shown in FIG. 5, process 500 may include selecting one or more metamorphic relations (MRs), that are to be used for performing the metamorphic testing procedure, based on the type of ML process used by the ML application (block 540). For example, the verification platform (e.g., verification platform 220, using computing resource 224, processor 320, memory 330, storage component 340, and/or the like) may select one or more metamorphic relations (MRs), that are to be used for performing the metamorphic testing procedure, based on the type of ML process used by the ML application, as described above with regard to FIGS. 1A-1E.

As further shown in FIG. 5, process 500 may include generating test data that is to be used to test the one or more MRs (block 550). For example, the verification platform (e.g., verification platform 220, using computing resource 224, processor 320, memory 330, storage component 340, and/or the like) may generate test data that is to be used to test the one or more MRs, as described above with regard to FIGS. 1A-1E.

As further shown in FIG. 5, process 500 may include configuring an environment that will support performance of the metamorphic testing procedure after selecting the one or more MRs (block 560). For example, the verification platform (e.g., verification platform 220, using computing resource 224, processor 320, memory 330, storage component 340, and/or the like) may configure an environment that will support performance of the metamorphic testing procedure after selecting the one or more MRs, as described above with regard to FIGS. 1A-1E.

As further shown in FIG. 5, process 500 may include verifying one or more aspects of the ML application by using the one or more MRs and the test data to perform the metamorphic testing procedure in the environment (block 570). For example, the verification platform (e.g., verification platform 220, using computing resource 224, processor 320, memory 330, storage component 340, and/or the like) may verify one or more aspects of the ML application by using the one or more MRs and the test data to perform the metamorphic testing procedure in the environment, as described above with regard to FIGS. 1A-1E.

As further shown in FIG. 5, process 500 may include generating a report that includes verification results data indicating whether the one or more aspects of the ML application have been verified (block 580). For example, the verification platform (e.g., verification platform 220, using computing resource 224, processor 320, memory 330, storage component 340, and/or the like) may generate a report that includes verification results data indicating whether the one or more aspects of the ML application have been verified, as described above with regard to FIGS. 1A-1E.

As further shown in FIG. 5, process 500 may include providing the report to the user device (block 590). For example, the verification platform (e.g., verification platform 220, using computing resource 224, processor 320, memory 330, storage component 340, output component 360, communication interface 370, and/or the like) may provide the report to the user device, as described above with regard to FIGS. 1A-1E.

Process 500 may include additional implementations, such as any single implementation or any combination of implementations described below and/or in connection with one or more other processes described elsewhere herein.

In some implementations, when selecting the one or more MRs, the verification platform may select the one or more MRs, from a plurality of MRs, based on the type of ML process used by the ML application, a first indication of whether source code of the ML application has been made accessible to the device, and a second indication of whether training data used to train the ML application has been made accessible to the device. In some implementations, the one or more types of data used by the ML application may include at least one of: image data, text data, audio data, or multimedia data.

In some implementations, when configuring the environment, the verification platform may select one or more tools to be used within the environment. The one or more tools may be selected based on at least one of: the type of ML process used by the ML application, or the type of data used by the ML application. In some implementations, the verification platform may configure the environment to support the one or more tools. In some implementations, the type of ML process used by the ML application may be a first type of ML process that uses supervised ML, a second type of ML process that uses unsupervised ML, or a third type of ML process that uses reinforcement ML.

In some implementations, the verification platform may validate the metamorphic testing procedure by using a mutation testing technique to determine whether the one or more MRs identify particular errors that were inserted into the ML application for testing, and the verification platform, when providing the report that includes the verification results data, may provide, to the user device, the report that includes the verification results data and validation results data identifying a result of validating the metamorphic testing procedure.

In some implementations, when providing the report to the user device, the verification platform may provide the report for display on a user interface of the user device. The report may include the verification results data indicating whether the one or more aspects of the ML application have been verified and at least one of: data identifying a first group of recommendations associated with correcting errors identified within the ML application, or data identifying a second group of recommendations associated with improving accuracy of a data model used by the ML application.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
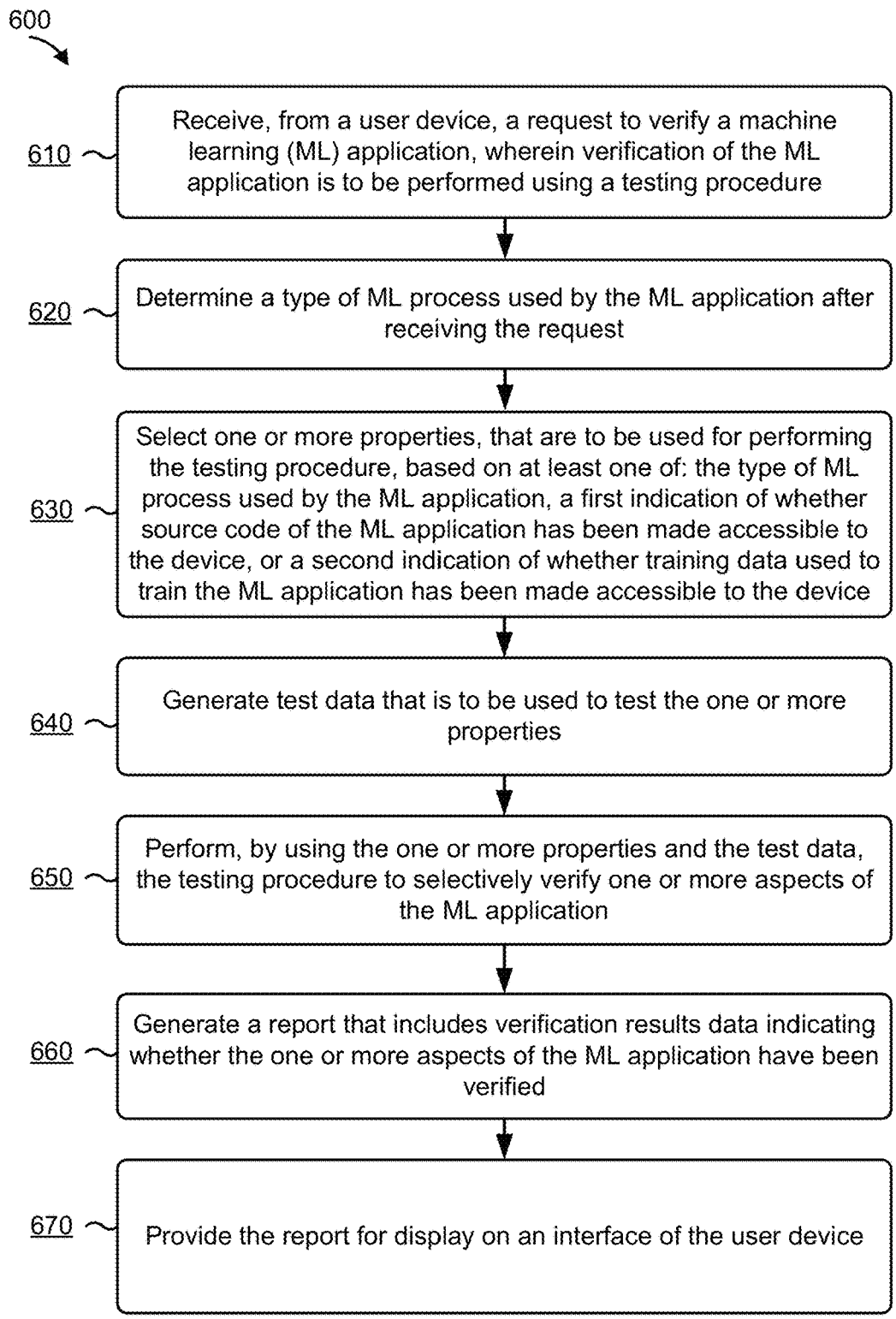

FIG. 6 is a flow chart of an example process 600 for verifying a machine learning application by performing a metamorphic testing procedure. In some implementations, one or more process blocks of FIG. 6 may be performed by a verification platform (e.g., verification platform 220). In some implementations, one or more process blocks of FIG. 6 may be performed by another device or a group of devices separate from or including the verification platform, such as a user device (e.g., user device 210) and/or a data storage device (e.g., data storage device 230).

As shown in FIG. 6, process 600 may include receiving, from a user device, a request to verify a machine learning (ML) application, wherein verification of the ML application is to be performed using a testing procedure (block 610). For example, the verification platform (e.g., verification platform 220, using computing resource 224, processor 320, memory 330, storage component 340, input component 350, communication interface 370, and/or the like) may receive, from a user device (e.g., user device 210), a request to verify a ML application, as described above with regard to FIGS. 1A-1E. In some implementations, verification of the ML application may be performed using a testing procedure.

As further shown in FIG. 6, process 600 may include determining a type of ML process used by the ML application after receiving the request (block 620). For example, the verification platform (e.g., verification platform 220, using computing resource 224, processor 320, memory 330, storage component 340, and/or the like) may determine a type of ML process used by the ML application after receiving the request, as described above with regard to FIGS. 1A-1E.

As further shown in FIG. 6, process 600 may include selecting one or more properties, that are to be used for performing the testing procedure, based on at least one of: the type of ML process used by the ML application, a first indication of whether source code of the ML application has been made accessible to the device, or a second indication of whether training data used to train the ML application has been made accessible to the device (block 630). For example, the verification platform (e.g., verification platform 220, using computing resource 224, processor 320, memory 330, storage component 340, and/or the like) may select one or more properties, that are to be used for performing the testing procedure, based on at least one of: the type of ML process used by the ML application, a first indication of whether source code of the ML application has been made accessible to the device, or a second indication of whether training data used to train the ML application has been made accessible to the device, as described above with regard to FIGS. 1A-1E.

As further shown in FIG. 6, process 600 may include generating test data that is to be used to test the one or more properties (block 640). For example, the verification platform (e.g., verification platform 220, using computing resource 224, processor 320, memory 330, storage component 340, and/or the like) may generate test data that is to be used to test the one or more properties, as described above with regard to FIGS. 1A-1E.

As further shown in FIG. 6, process 600 may include performing, by using the one or more properties and the test data, the testing procedure to selectively verify one or more aspects of the ML application (block 650). For example, the verification platform (e.g., verification platform 220, using computing resource 224, processor 320, memory 330, storage component 340, and/or the like) may perform, by using the one or more properties and the test data, the testing procedure to selectively verify one or more aspects of the ML application, as described above with regard to FIGS. 1A-1E. In some cases, selectively verifying the one or more aspects of the ML application may refer to verifying, or not verifying, each of the one or more aspects of the ML application.

As further shown in FIG. 6, process 600 may include generating a report that includes verification results data indicating whether the one or more aspects of the ML application have been verified (block 660). For example, the verification platform (e.g., verification platform 220, using computing resource 224, processor 320, memory 330, storage component 340, and/or the like) may generate a report that includes verification results data indicating whether the one or more aspects of the ML application have been verified, as described above with regard to FIGS. 1A-1E.

As further shown in FIG. 6, process 600 may include providing the report for display on an interface of the user device (block 670). For example, the verification platform (e.g., verification platform 220, using computing resource 224, processor 320, memory 330, storage component 340, output component 360, communication interface 370, and/or the like) may provide the report for display on an interface of the user device, as described above with regard to FIGS. 1A-1E.

Process 600 may include additional implementations, such as any single implementation or any combination of implementations described below and/or in connection with one or more other processes described elsewhere herein.

In some implementations, the testing procedure may be a metamorphic testing procedure and the one or more properties may be one or more metamorphic relations (MRs). In some implementations, the one or more MRs may include at least one of: a first MR for testing permutations of a class label of a class associated with the ML application, a second MR for testing permutations of one or more features used to train the ML application, a third MR for testing permutations that modify the one or more features by a constant value, a fourth MR for testing permutations of an order in which the one or more features are used to train the ML application, a fifth MR for testing scaling of the one or more features, or a sixth MR for testing normalization of the one or more features.

In some implementations, the verification platform may determine one or more types of data used by the ML application. In some implementations, the verification platform may select one or more tools to be used as part of a virtual environment that will support performance of the testing procedure. The one or more tools may be selected based on the one or more types of data. In some implementations, the verification platform may configure the virtual environment to support the one or more tools. In some implementations, when selectively verifying the one or more aspects of the ML application, the verification platform may use the one or more properties and the test data to perform the testing procedure in the virtual environment.

In some implementations, the verification platform may validate the testing procedure by using a mutation testing technique to determine whether the one or more properties identify particular errors that were inserted into the ML application for testing. In some implementations, when providing the report that includes the verification results data, the verification platform may provide, to the user device, the verification results data and validation results data identifying a result of validating the testing procedure.

In some implementations, when generating the report, the verification platform may generate one or more recommendations identifying actions to perform. The actions may be selected based on verification of the one or more aspects of the ML. The actions may include at least one of: a first action to proceed with deployment of the ML application, a second action associated with correcting errors identified within the ML application, or a third action associated with improving accuracy of a data model used for the ML application. In some implementations, the verification platform may include, in the report, the one or more recommendations.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Although implementations, described herein, are described in connection with machine learning-based applications, the implementations, described herein, may be applied to any intelligence-based applications, such as, for example, artificial intelligence-based applications, data mining-based applications, deep-learning based application, and/or the like.

Although implementations, described herein, are performed using a metamorphic testing procedure, the implementations, described herein, may be performed using another type of testing procedure, such as a testing procedure that uses assertion checking, adversarial examples, special values, benchmark data, fuzzy matching, and/or the like.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and from a user device, a request to verify a machine learning (ML) application,
      wherein verification of the ML application is to be performed using a metamorphic testing procedure, and
      wherein the request includes an indication to validate the metamorphic testing procedure;
   determining, by the device, a type of ML process used by the ML application after receiving the request;
   selecting, by the device, one or more metamorphic relations (MRs), that are to be used for performing the metamorphic testing procedure, based on the type of ML process used by the ML application;
   receiving, by the device, test data that is to be used to test the ML application,
      wherein the test data is based on the one or more MRs;
   performing, by the device and by using the one or more MRs and the test data, the metamorphic testing procedure to verify one or more aspects of the ML application;
   validating, by the device, the metamorphic testing procedure by using a mutation testing technique to determine whether the one or more MRs identify particular errors that were inserted into the ML application for testing;
   generating, by the device, a report that includes verification results data indicating whether the one or more aspects of the ML application have been verified and validation results data identifying a result of validating the metamorphic testing procedure; and
   providing, by the device, the report for display on an interface of the user device.

2. The method of claim 1, wherein selecting the one or more MRs comprises:
   selecting the one or more MRs, from a plurality of MRs, based on the type of ML process used by the ML application and at least one of:
      a first indication of whether source code of the ML application has been made accessible to the device, or
      a second indication of whether training data used to train the ML application has been made accessible to the device.

3. The method of claim 1, further comprising:
   determining, before selecting the one or more MRs, one or more types of data used by the ML application;
   selecting one or more tools to be used within an environment that will support performance of the metamorphic testing procedure,
      wherein the one or more tools are selected based on the one or more types of data used by the ML application;
   configuring the environment to support the one or more tools; and wherein verifying the one or more aspects of the ML application comprises:
   using the one or more MRs and the test data to perform the metamorphic testing procedure in the environment.

4. The method of claim 1, wherein the type of ML process used by the ML application is:
   a first type of ML process that uses classification,
   a second type of ML process that uses clustering, or
   a third type of ML process that uses regression.

5. The method of claim 1, wherein the one or more MRs include at least one of:
   a first MR for testing permutations of a class label of a class associated with the ML application,
   a second MR for testing permutations of one or more features used to train the ML application,
   a third MR for testing permutations that modify the one or more features by a constant value,
   a fourth MR for testing permutations of an order in which the one or more features are used to train the ML application,
   a fifth MR for testing scaling of the one or more features, or
   a sixth MR for testing normalization of the one or more features.

6. The method of claim 1, wherein the ML application includes at least one aspect that is unable to be verified; and wherein generating the report comprises:
   generating one or more recommendations for correcting errors identified within the ML application or for improving accuracy of a data model used for the ML application; and
   generating the report that includes the verification results data,
      wherein the verification results data includes at least one of:
         first data identifying the at least one aspect of the ML application that is unable to be verified,
         second data identifying a particular MR, of the one or more MRs, that failed the metamorphic testing procedure, or
         third data identifying the one or more recommendations.

7. The method of claim 1, wherein validating the metamorphic testing procedure comprises:
   validating the metamorphic testing procedure based on completion of the metamorphic testing procedure; or
   validating the metamorphic testing procedure based on a threshold confidence level of the result of the metamorphic testing procedure not being satisfied.

8. A device, comprising:
   one or more memories; and
   one or more processors, operatively connected to the one or more memories, to:
      receive, from a user device, a request to verify a machine learning (ML) application,
         wherein verification of the ML application is to be performed using a metamorphic testing procedure;
      determine a type of ML process used by the ML application after receiving the request;
      determine one or more types of data used by the ML application after receiving the request;
      select one or more metamorphic relations (MRs), that are to be used for performing the metamorphic testing procedure, based on the type of ML process used by the ML application;
      generate test data that is to be used to test the one or more MRs;
      configure an environment that will support performance of the metamorphic testing procedure after selecting the one or more MRs;
      verify one or more aspects of the ML application by using the one or more MRs and the test data to perform the metamorphic testing procedure in the environment;
      validate the metamorphic testing procedure by using a mutation testing technique to determine whether the one or more MRs identify particular errors that were inserted into the ML application for testing;
      generate a report that includes verification results data indicating whether the one or more aspects of the ML application have been verified and the validation results identifying a result of validating the metamorphic testing procedure; and
      provide the report to the user device.

9. The device of claim 8, wherein the one or more processors, when selecting the one or more MRs, are to:
   select the one or more MRs, from a plurality of MRs, based on:
      the type of ML process used by the ML application,
      a first indication of whether source code of the ML application has been made accessible to the device, and
      a second indication of whether training data used to train the ML application has been made accessible to the device.

10. The device of claim 8, wherein the one or more types of data used by the ML application include at least one of:
   image data,
   text data,
   audio data, or
   multimedia data.

11. The device of claim 8, wherein the one or more processors, when configuring the environment, are to:
   select one or more tools to be used within the environment,
      wherein the one or more tools are selected based on at least one of:
         the type of ML process used by the ML application, or
         the one or more types of data used by the ML application; and
   configure the environment to support the one or more tools.

12. The device of claim 8, wherein the type of ML process used by the ML application is:
   a first type of ML process that uses supervised ML,
   a second type of ML process that uses unsupervised ML,
   a third type of ML process that uses reinforcement ML.

13. The device of claim 8, wherein the one or more processors, when providing the report to the user device, are to:
   provide the report for display on a user interface of the user device,
      wherein the report includes the verification results data indicating whether the one or more aspects of the ML application have been verified and at least one of:
         data identifying a first group of recommendations associated with correcting errors identified within the ML application, or data identifying a second group of recommendations associated with improving accuracy of a data model used by the ML application.

14. The device of claim 8, wherein the one or more processors, when validating the metamorphic testing procedure, are to:
validate the metamorphic testing procedure based on completion of the metamorphic testing procedure; or
validate the metamorphic testing procedure based on a threshold confidence level of the result of the metamorphic testing procedure not being satisfied.

15. A non-transitory computer-readable medium storing instructions, the instructions comprising:
one or more instructions that, when executed by one or more processors of a device, cause the one or more processors to:
receive, from a user device, a request to verify a machine learning (ML) application,
wherein verification of the ML application is to be performed using a testing procedure;
determine a type of ML process used by the ML application after receiving the request;
select one or more properties, that are to be used for performing the testing procedure, based on at least one of:
the type of ML process used by the ML application,
a first indication of whether source code of the ML application has been made accessible to the device, or
a second indication of whether training data used to train the ML application has been made accessible to the device;
generate test data that is to be used to test the one or more properties;
perform, by using the one or more properties and the test data, the testing procedure to selectively verify one or more aspects of the ML application;
validate the testing procedure by using a mutation testing technique to determine whether the one or more properties identify particular errors that were inserted into the ML application for testing;
generate a report that includes verification results data indicating whether the one or more aspects of the ML application have been verified and validation results data identifying a result of validating the testing procedure; and
provide the report for display on an interface of the user device.

16. The non-transitory computer-readable medium of claim 15, wherein the testing procedure is a metamorphic testing procedure and the one or more properties are one or more metamorphic relations (MRs).

17. The non-transitory computer-readable medium of claim 16, wherein the one or more MRs include at least one of:
a first MR for testing permutations of a class label of a class associated with the ML application,
a second MR for testing permutations of one or more features used to train the ML application,
a third MR for testing permutations that modify the one or more features by a constant value,
a fourth MR for testing permutations of an order in which the one or more features are used to train the ML application,
a fifth MR for testing scaling of the one or more features, or
a sixth MR for testing normalization of the one or more features.

18. The non-transitory computer-readable medium of claim 15, wherein the one or more instructions, when executed by the one or more processors, further cause the one or more processors to:
determine one or more types of data used by the ML application;
select one or more tools to be used as part of a virtual environment that will support performance of the testing procedure,
wherein the one or more tools are selected based on the one or more types of data;
configure the virtual environment to support the one or more tools; and
wherein the one or more instructions, that cause the one or more processors to selectively verify the one or more aspects of the ML application, cause the one or more processors to:
use the one or more properties and the test data to perform the testing procedure in the virtual environment.

19. The non-transitory computer-readable medium of claim 15, wherein the one or more instructions, that cause the one or more processors to generate the report, cause the one or more processors to:
generate one or more recommendations identifying actions to perform,
wherein the actions are selected based on verification of the one or more aspects of the ML, and
wherein the actions include at least one of:
a first action to proceed with deployment of the ML application,
a second action associated with correcting errors identified within the ML application, or
a third action associated with improving accuracy of a data model used for the ML application; and
include, in the report, the one or more recommendations.

20. The non-transitory computer-readable medium of claim 15, wherein the one or more instructions, that cause the one or more processors to validate the testing procedure, cause the one or more processors to:
validate the testing procedure based on completion of the testing procedure; or
validate the testing procedure based on a threshold confidence level of the result of the testing procedure not being satisfied.

* * * * *